United States Patent
Ding et al.

(10) Patent No.: US 7,673,645 B2
(45) Date of Patent: *Mar. 9, 2010

(54) GAS DELIVERY METHOD AND SYSTEM INCLUDING A FLOW RATIO CONTROLLER USING A MULTIPLE ANTISYMMETRIC OPTIMAL CONTROL ARRANGEMENT

(75) Inventors: Junhua Ding, Tewksbury, MA (US); Kaveh H. Zarkar, Andover, MA (US)

(73) Assignee: MKS Instruments, Inc., Andover, MA (US)

( * ) Notice: Subject to any disclaimer, the term of this patent is extended or adjusted under 35 U.S.C. 154(b) by 61 days.

This patent is subject to a terminal disclaimer.

(21) Appl. No.: 11/708,284

(22) Filed: Feb. 20, 2007

(65) Prior Publication Data

US 2007/0186983 A1    Aug. 16, 2007

Related U.S. Application Data

(63) Continuation-in-part of application No. 11/111,646, filed on Apr. 21, 2005.

(51) Int. Cl.
  *G05D 11/13* (2006.01)
(52) U.S. Cl. .................. 137/9; 137/487.5; 137/599.07; 137/870
(58) Field of Classification Search .................. 137/9, 137/487.5, 101, 101.19, 599.07, 870
See application file for complete search history.

(56) References Cited

U.S. PATENT DOCUMENTS 2,895,502 A * 7/1959 Roper et al. ................ 137/486
4,107,246 A    8/1978 LaSpisa
4,294,277 A * 10/1981 Szeliga ................... 137/101.19
4,369,031 A    1/1983 Goldman et al.
4,573,802 A * 3/1986 Kerrigan et al. ........... 366/152.1

(Continued)

FOREIGN PATENT DOCUMENTS

WO    02095519    11/2002

OTHER PUBLICATIONS

International Search Report for corresponding PCT Application No. PCT/US2008/050834, 4pp.

(Continued)

*Primary Examiner*—Stephen Hepperle
*Assistant Examiner*—William McCalister
(74) *Attorney, Agent, or Firm*—McDermott Will & Emery LLP

(57) ABSTRACT

The multiple antisymmetric optimal (MAO) control algorithm is disclosed for a gas delivery system including a flow ratio controller for dividing a single mass flow into multiple flow lines. In the MAO control algorithm, each flow line is provided with a flow sensor and a valve actively controlled by a SISO feedback controller combined with a linear saturator to achieve the targeted flow ratio set point. For optimal control performance, these SISO controller and linear saturators are substantial identical. It is proved that each valve control command is multiple antisymmetric to the summation of all other valve control commands. Therefore, the MAO control algorithm guarantees that there exists at least one valve at the allowable maximum open position at any moment, which achieves the optimal solution in terms of the maximum total valve conductance for a given set of flow ratio set points.

14 Claims, 5 Drawing Sheets

U.S. PATENT DOCUMENTS

| | | | | |
|---|---|---|---|---|
| 5,329,965 A | * | 7/1994 | Gordon | 137/599.07 |
| 5,453,124 A | | 9/1995 | Moslehi et al. | |
| 6,333,272 B1 | * | 12/2001 | McMillin et al. | 438/710 |
| 6,418,954 B1 | | 7/2002 | Taylor et al. | |
| 6,752,166 B2 | * | 6/2004 | Lull et al. | 137/9 |
| 6,766,260 B2 | * | 7/2004 | Ambrosina et al. | 702/45 |
| 7,353,841 B2 | * | 4/2008 | Kono et al. | 137/487.5 |
| 2002/0038669 A1 | | 4/2002 | Yamagishi et al. | |
| 2003/0130807 A1 | | 7/2003 | Ambrosina et al. | |
| 2006/0237063 A1 | | 10/2006 | Ding et al. | |

OTHER PUBLICATIONS

Written Opinion for corresponding PCT Application No. PCT/US2008/050834, 6pp.

Seborg et al., Process Dynamics and Control, Copyright 1989, John Wiley & Sons, Inc., ISBN 0-471-86389-0, pp. 390-393.

* cited by examiner

GAS DELIVERY METHOD AND SYSTEM INCLUDING A FLOW RATIO CONTROLLER USING A MULTIPLE ANTISYMMETRIC OPTIMAL CONTROL ARRANGEMENT

RELATED APPLICATIONS

This application is a continuation-in-part of U.S. application Ser. No. 11/111,646, filed Apr. 21, 2005 in the names of Junhua Ding, John A. Smith and Kaveh Zarkar, and assigned to the present assignee.

FIELD OF THE DISCLOSURE

The present disclosure relates generally to semiconductor processing equipment and, more particularly, to a flow ratio controller for delivering contaminant-free, precisely metered quantities of process gases to at least two locations of a processing tool or tools. More particularly, the present disclosure relates to a system for and method of dividing flow from a single gas box to at least two, and preferably three or more locations of a processing tool or tools.

BACKGROUND OF THE DISCLOSURE

The fabrication of semiconductor devices often requires the careful synchronization and precisely measured delivery of as many as a dozen gases to a processing tool, such as a vacuum chamber. Various recipes are used in the fabrication process, and many discrete processing steps can be required, where for example a semiconductor device is cleaned, polished, oxidized, masked, etched, doped, or metalized. The steps used, their particular sequence and the materials involved all contribute to the making of particular devices.

Accordingly, wafer fabrication facilities are commonly organized to include areas in which chemical vapor deposition, plasma deposition, plasma etching, sputtering and other similar gas manufacturing processes are carried out. The processing tools, be they chemical vapor deposition reactors, vacuum sputtering machines, plasma etchers or plasma enhanced chemical vapor deposition chambers, or any other device, apparatus or system, must be supplied with various process gases. Pure gases must be supplied to the tools in contaminant-free, precisely metered quantities.

In a typical wafer fabrication facility the gases are stored in tanks, which are connected via piping or conduit to a gas delivery system. The gas delivery system includes a gas box for delivering contaminant-free, precisely metered quantities of pure inert or reactant gases from the tanks of the fabrication facility to a process tool and/or chamber. The gas box typically includes a plurality of gas flow lines each having a flow metering unit, which in turn can include valves, pressure regulators and transducers, mass flow controllers, filters/purifiers and the like. Each gas line has its own inlet for connection to a separate source of gas, but all of the gas paths converge into a single outlet for connection to the process tool.

Sometimes dividing or splitting the combined process gases so that they can be delivered to multiple locations of a single tool or among multiple processing tools is desired. In such cases, the single outlet of the gas box is connected to the multiple locations through secondary flow lines. In some applications, where, for example, the upstream pressure needs to be kept lower than atmospheric pressure (e.g., kept at 15 PSIA) for safety or other reasons, a flow ratio controller is used to insure that the primary flow of the outlet of the gas box is divided in accordance with a preselected ratio among the secondary flow paths. Examples of split flow systems are described in U.S. Pat. Nos. 4,369,031; 5,453,124; 6,333,272; 6,418,954 and 6,766,260; published U.S. Application No. 2002/0038669 and the pending parent application U.S. application Ser. No. 11/111,646, filed Apr. 21, 2005 in the names of Junhua Ding, John A. Smith and Kaveh Zarkar, and assigned to the present assignee (Attorney's Docket 56231-526, MKS-158). The flow ratio controller of U.S. Pat. No. 6,766,260 is of particular interest because each secondary flow line is controlled with a separate flow sensor and control valve.

Flow ratio controllers of the type shown in U.S. Pat. No. 6,766,260 will stabilize to the desirable ratio split after being initially set, but flows take time to stabilize, and in some applications this can be unsatisfactory. Further, the pressure drop across the flow ratio controller is high, and the controller provides poor control performance for handling downstream blocking of one of the secondary flow paths. Additionally, the system can be difficult to set up because of difficulties in initially determining fixed valve positions of the valves in the secondary flow lines. And for current embodiments using two secondary flow lines it is necessary to assign the high flow valve as the fixed valve and the low flow valve as the controlled valve for flow control.

All of these prior art flow ratio controllers are designed to control the relative ratio of only two secondary flow lines. The issues become even more complex when the relative ratios of more than two secondary flow lines of a distributed system are to be controlled. A linear time invariant (LTI) system using a state space approach would provide insufficient dynamic range, and the nonlinear valve curves of the control valves make it difficult, if not impossible to use only one set of linearized model coefficients to describe a multiple-channel flow ratio controller (hereinafter "MCMFC"). Further, LTI systems require control of select variables. Good candidates to use as state variables are pressures, temperatures and flow rates. However, such variables are not always observable. For example, there is no way for a thermal sensor to sense absolute flow rate. In addition, there is no pressure information available to use for estimating these state variables. Finally, a high order state space controller may not be suitable for distributed systems where flow ratio through three or more lines need to be controlled.

SUMMARY

In accordance with one aspect of the disclosure, a multiple-channel gas delivery system comprises: a primary channel; at least two secondary channels; and a flow ratio controller coupled to the primary channel and the plurality of secondary channels so as to receive the gas through the primary channel and control the ratio of the flow rate of the gas through each of the secondary channels relative to the entire flow rate.

In accordance with another aspect of the disclosure, a multiple-channel gas delivery system comprises: a primary channel; at least two secondary channels; and a flow ratio controller coupled to the primary channel and the plurality of secondary channels so as to receive the gas through the primary channel and control the ratio of the flow rate of the gas through each of the secondary channels relative to the entire flow rate, wherein the flow ratio controller includes for each secondary channel a flow sensor and a valve actively controlled by the a SISO feedback controller and a linear saturator to achieve the targeted flow ratio set point, wherein all of the SISO feedback controllers are substantially identical, and all of the linear saturators are substantially identical.

And in accordance with yet another aspect of the disclosure, a multiple-channel gas delivery system comprises: a gas inlet channel, and at least two secondary channels; a flow meter, including a flow sensor and a valve, arranged so as to control the flow through each of the secondary channels; a multiple antisymmetric optimal (MAO) controller configured and arranged so as to control the ratio of the flow of gas through each of at least two secondary channels relative to the entire combined flow through all of the secondary channels, wherein the controller is configured so as to provide (a) substantially optimal control of the mass flow in the secondary flow lines so as to maintain the ratios of the secondary flows relative to the total flow, (b) control of the mass flow in each of the secondary flow lines so as to maintain the ratio of the secondary flows at preselected set points such that should the flow decrease in one flow line so that the ratio of the secondary flows deviate from the preselected set point, the controller will adjust the relative secondary flows through the secondary flow lines so as to bring the ratio back to the preselected set point; wherein at least one of the valves provides substantial maximum allowable valve conductance position at any one moment of operation, while the other valves are actively controlled to maintain the preselected value of the flow ratio through each of the corresponding secondary channels.

Finally, in accordance with another aspect of the disclosure, a system and method are provided for controlling the ratio of the flow rate of gas from a primary channel through each of a plurality of secondary channels relative to the entire flow rate in accordance with a substantially optimal control solution for a given set of flow ratio set points $\{r_{spi}\}$ at any moment. The method includes:

(i) determining the measured flow ratio through each of the secondary channels;

(ii) determining the measured total flow ($Q_{Tm}$) as a function of the measured flow through each of the secondary channels;

(iii) comparing the measured flow ratio through each of the secondary channels with a corresponding flow ratio set point so as to generate an error signal for each such secondary channel; and (iv) applying each of the error signals to a corresponding SISO feedback controller so as to generate a valve control command associated with a corresponding control valve used to control the flow of gas through the respective secondary channel so as achieve the given set of flow ratio set points through the corresponding secondary channels.

BRIEF DESCRIPTION OF THE DRAWINGS

Reference is made to the attached drawings, wherein elements having the same reference character designations represent like elements throughout, and wherein.

DETAILED DESCRIPTION OF THE DRAWINGS

Figure 1:
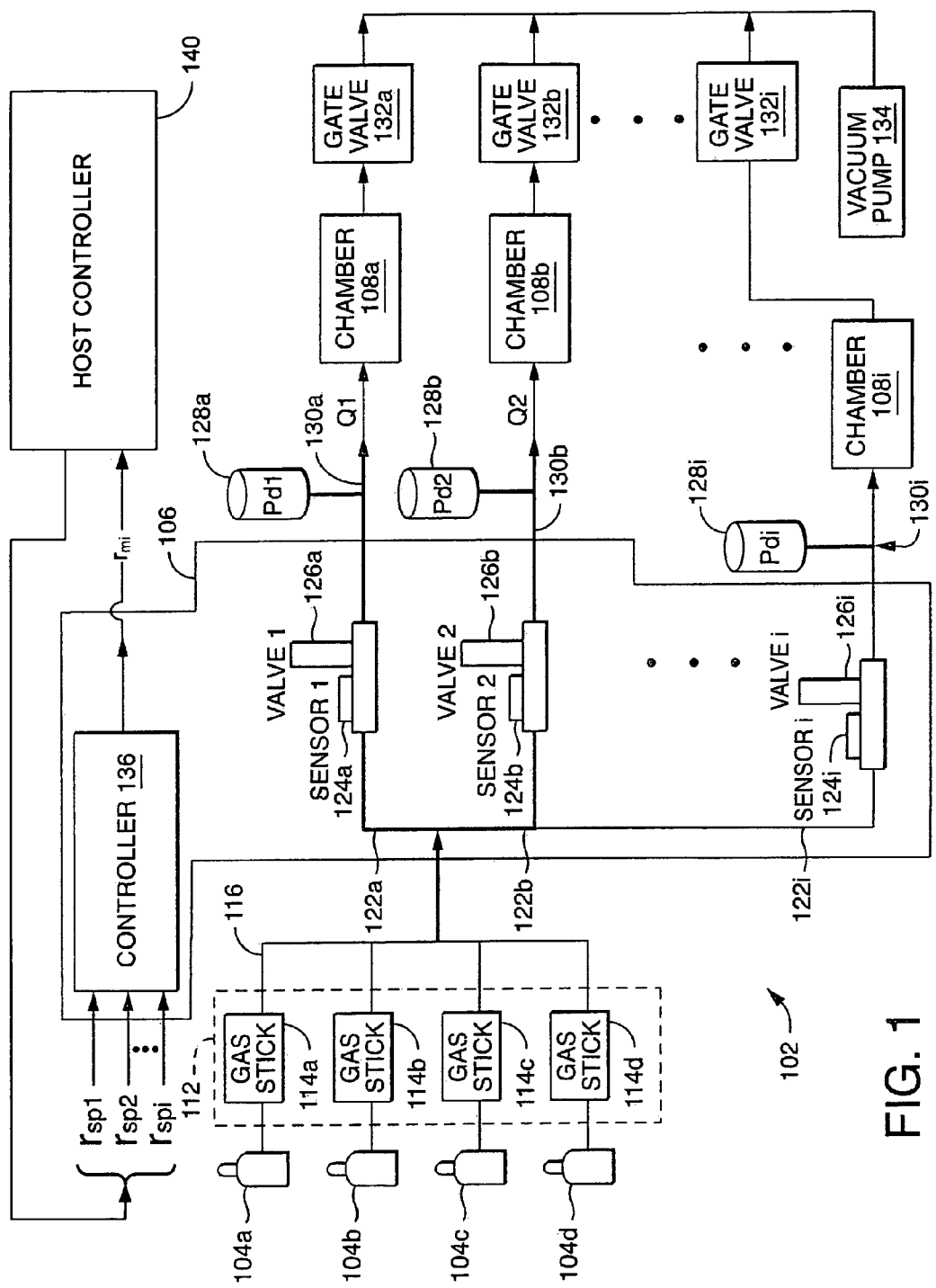
FIG. 1 is a general block diagram of a preferred embodiment of a multiple-channel gas delivery system including a flow ratio controller configured in accordance with the present disclosure so as to deliver predetermined ratios of flow rates of gas through the respective channels, each relative to the total flow rate delivered through all of the channels.

Referring to FIG. 1, the present disclosure provides a novel control approach for a multiple-channel gas delivery system including a flow ratio controller arranged so as to precisely control the ratio of the flow rate of gas through each of the secondary flow paths or channels of the multi-channel gas delivery system relative to the entire flow rate. The control system and method are intended for use with flow metering systems for delivering contaminant-free, precisely metered quantities of process and purge gases to semiconductor processing tools, chambers and/or other systems, apparatus and devices. The control system and method provide the benefit of dividing a single flow of gas into multiple secondary flows of known, precise relative values of preselected ratios, without requiring a relatively high upstream pressure. The flow ratio controller, generally shown at 106 in FIG. 1 as a part of a multi-channel gas delivery system 102, selectively receives individual or mixtures of multiple gases, including, for example a number of process gases and a purge gas, from gas supplies (e.g., gas tanks), shown by way of example at 104a, 104b, 104c, 104d. The gas box 112 supplies the gas mixture to flow ratio controller 106, the latter being shown connected to respective process chambers 108a, 108b . . . 108i (alternatively, the gases can be metered to different injectors or areas of a single process chamber and or other processing tools). The gas box 112 includes a plurality of gas sticks, for example shown 114a, 114b, 114c and 114d, each preferably being fluidly connected to a corresponding gas supply 104 and for individually controlling the flow of gas from the corresponding gas supply 104. Although four gas supplies 104 and corresponding gas sticks 114 are shown in FIG. 1, the number of supplies and gas sticks can be any number (including one). Each gas stick 114 includes, for example, a mass flow controller (MFC), a valve positioned before the MFC and a valve positioned after the MFC, as for example, shown in U.S. Pat. No. 6,418,954. The gas sticks 114 each provide a controllable gas passageway so that a contaminant-free, precisely metered amount of a gas, or combination of gases, can be supplied to the flow ratio controller 106, and then precisely split/divided to the process chambers 108a, 108b . . . 108i at preselected flow ratios. Although not shown, the gas sticks can each be provided with other components for monitoring or controlling gases, such as filters, purifiers, pressure transducers, controllers, etc. The gas sticks 114 connect together to an outlet manifold 116 for example, to allow the gas flow from each stick to be mixed if desired prior to leaving the gas box. The outlet manifold is connected to the flow ratio controller 106.

The flow ratio controller 106 includes two or more flow paths or lines 122a, 122b . . . 122i. Each flow path includes a sensor 124 and valve 126. Sensor 124 generates a flow rate signal for use in controlling a valve 126 so as to control the mass flow through each flow path. The sensor and valve are thus used together to control the respective output mass flows $Q_1, Q_2, \ldots Q_i, \ldots Q_n$, of each flow path, and thus the flow ratio which is defined as:

$$r_i = Q_i/Q_T, i=1,2,\ldots,n \quad (1)$$

wherein $r_i$ is the flow ratio of line 122i, $Q_i$ is the flow through the line 122i, and $Q_T$ is the total flow of all flow lines 122 defined as $$Q_T = \Sigma Q_i = Q_1 + Q_2 + \ldots + Q_n. \quad (2)$$

According to Eq.(1) and Eq.(2), the summation of all flow ratios equals one, which can be expressed as $$\Sigma r_i = r_1 + r_2 + \ldots + r_i + \ldots + r_n = 1. \quad (3)$$

In the embodiment described herein, the control valves 126a, 126b . . . 126i are normally opened valves, but it should be appreciated that the disclosed system can also be designed with all normally closed valves, or some combination of the two. The outlet lines 130a, 130b . . . 130i of each of the flow paths is connected to a corresponding processing tool, which in the FIG. 1 illustration, are processing chambers 108a, 108b . . . 108i, respectively. The chambers are in turn provided with outlets connected to control valves, preferably in the form of gate valves 132a, 132b . . . 132i, which in turn are in fluid communication with one or more vacuum pumps 134, for use in drawing gases from the tanks through the chambers. Alternatively, the outlet lines can be respectively connected to a equal number of locations in only one process tool, or one or more locations in each of two or more process tools. The controller 136, among other things, receives the flow ratio set point inputs $r_{spi}$, one for each line 122i. $r_{spi}$ is a preselected value or set point of the flow ratio of the flow rate in line 122i relative to the total flow rate $Q_T$, as will be more fully apparent hereinafter. The controller is configured, among other things, to control and maintain the ratio of mass flow through each of the flow lines 122a, 122b . . . 122n (relative to the total flow rate) at the respective set point.

The MCFRC system of FIG. 1 is analyzed and modeled accordingly to provide a faster settling time for the flow ratios and the flows that are provided in each of the secondary flow lines, and provide the minimum pressure drop through the MCFRC for a given set of flow ratio set points. It is found that the settling time for flows and flow ratios are proportional to a time constant of the MCFRC system, $\tau_p$, defined as $$\tau_p = V_u / C_T \quad (4)$$

wherein Vu is the upstream volume of the MCFRC. $C_T$ is the total valve conductance of the MCFRC defined as $$C_T = \Sigma C_i(I_i), i=1, 2, \ldots, n \quad (5)$$

wherein the $C_i(I_i)$ is the valve conductance of valve 126i, which is a function of its valve current, $I_i$. In general, the valve conductance, $C_i$, can be determined by $$C_i(I_i) = Q_i / P_u \quad (6)$$

wherein $P_u$ is the upstream pressure of the MCFRC. It is also found that the upstream pressure, $P_u$, can be determined by $$P_u = Q_T / C_T \quad (7)$$

As can bee seen from Eq.(4) and Eq.(7), one must maximize the total valve conductance of the MCFRC system, $C_T$, in order to achieve the fastest settling time for flows and flow ratios, and the lowest upstream pressure hence the minimum pressure drop through the MCFRC system. Therefore, if a control algorithm can achieve the maximum total valve conductance for a given set of flow ratio set points at any time, the flow ratio controller will achieve the optimal control performance in terms of the fastest settling time for flow ratio and flows, and minimum pressure drop through the flow ratio controller.

Figure 2:
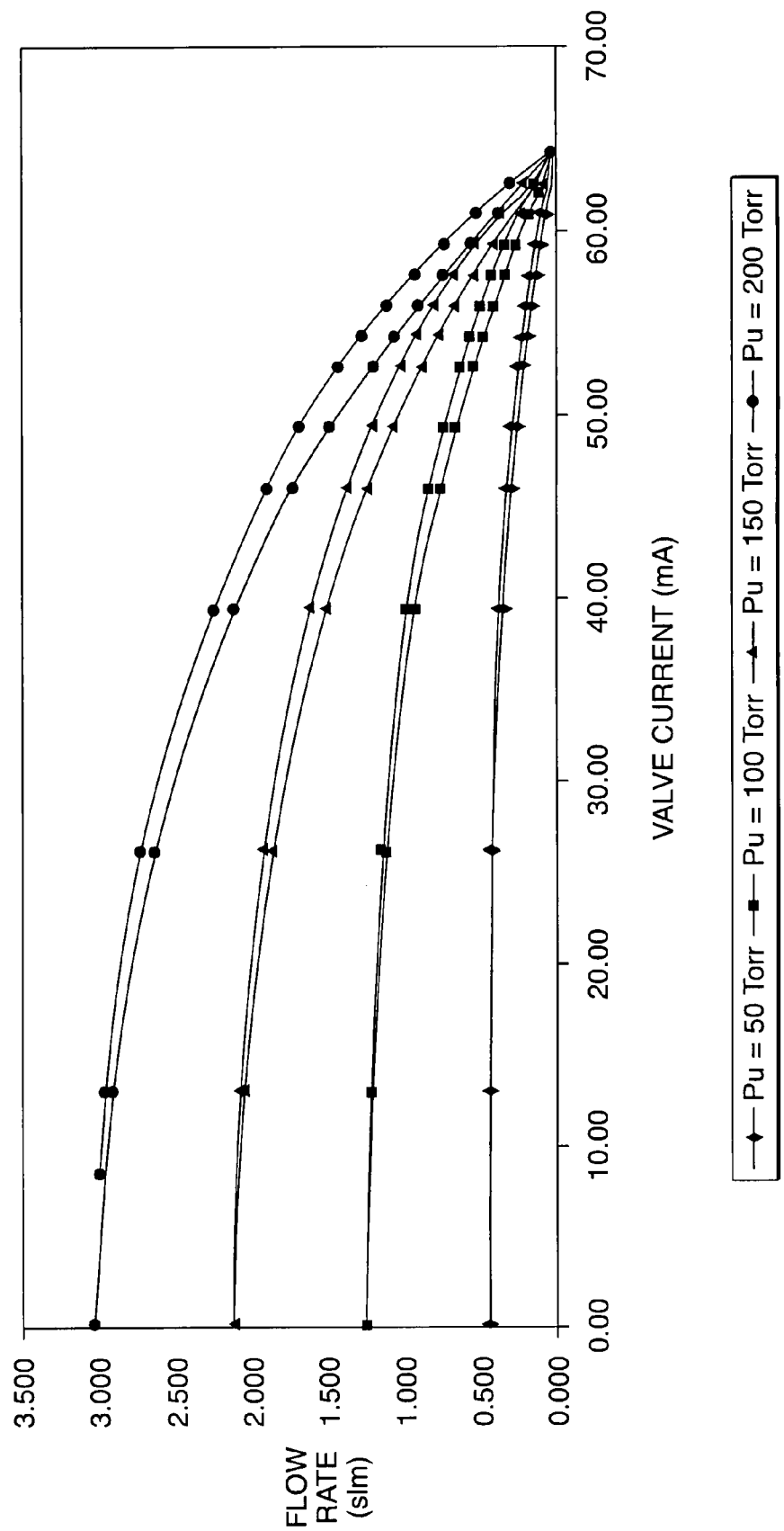
FIG. 2 is a graphical representation of valve control signal versus flow rate at different upstream pressures for a typical normally opened valve.

As illustrated in the following paragraphs, there exists one and only one optimal solution in terms of the maximum total valve conductance for a given set of flow ratio set points $\{r_i\}$ in a MCFRC system with normally open valves. The results also apply to MCFRC systems with normally closed valves. FIG. 2 shows a graphical representation of valve control current $I_i$ versus flow rate $Q_i$ for a typical normally opened valve, of the type that might be positioned in each of the secondary flow lines. Four sets of exemplary valve curves including valve current upward and downward measurements are shown for a typical normally opened valve at four upstream pressures of 50, 100, 150 and 200 Torr, while the downstream pressure is close to 0 Torr. As shown, for a normally opened valve, the valve conductance deceases as the valve current increases. The maximum valve conductance is achieved at I=0 or valve fully opened position for this normally opened valve.

Figure 3:
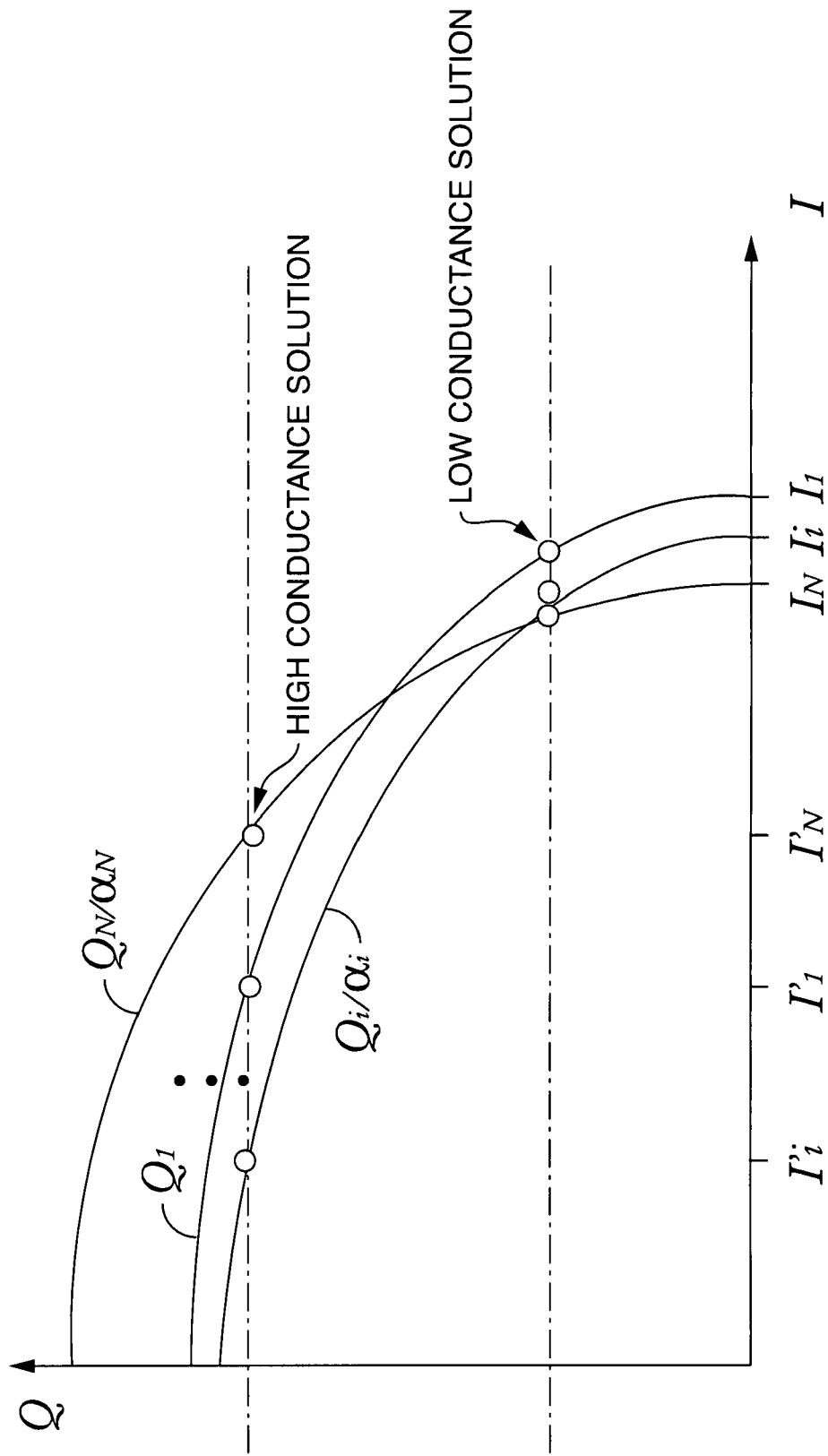
FIG. 3 is a graphical representation of examples of multiple valve control solutions for a given set of flow ratios of a multiple-channel flow ratio controller (MCFRC) system.

The auxiliary flow ratios, $\alpha_i$, can be defined as $$\alpha_i = r_i/r_1 = (Q_i/Q_T)/(Q_1/Q_T) = (Q_i/Q_1), i=1,2,\ldots,n \quad (8)$$

wherein $\alpha_i$ is the flow ratio between the flow channel i and the flow channel 1 (assume that $Q1 \neq 0$). A given set of flow ratios $\{r_i\}$, provides the corresponding set of auxiliary flow ratios $\{\alpha_i\}$. FIG. 3 shows all modified valve curves plotted in a valve current $(I_i)$ versus modified flow $(Q_i/\alpha_i)$ way. If a horizontal line has intersections with all modified valve curves as shown in FIG. 3, the intersections must satisfy the following condition:

$$Q_1 = Q_2/\alpha_2 = \ldots Q_i/\alpha_i = \ldots = Q_n/\alpha_n \quad (9)$$

This is exactly the condition which meets the given set of auxiliary flow ratios $\{\alpha_i\}$ or flow ratios $\{r_i\}$. The set of valve current $\{I_i\}$ corresponding to the intersections provides a solution for the MCFRC system to achieve the given set of flow ratios $\{r_i\}$. As shown, the intersections of these modified valve curves with any horizontal line give a set of solutions of valve currents $\{I_i\}$ which satisfies the given set of flow ratios $\{r_i\}$. In other words, there exist multiple solutions for the MCFRC system to achieve a given set of flow ratios $\{r_i\}$. The difference among these multiple solutions is the total valve conduction, $C_T$. The higher the horizontal line, the higher the total valve conduction as shown in FIG. 3. One can increase the height of the horizontal line to get a higher total valve conductance solution until the horizontal line cannot have intersections with all modified valve curves.

Figure 4:
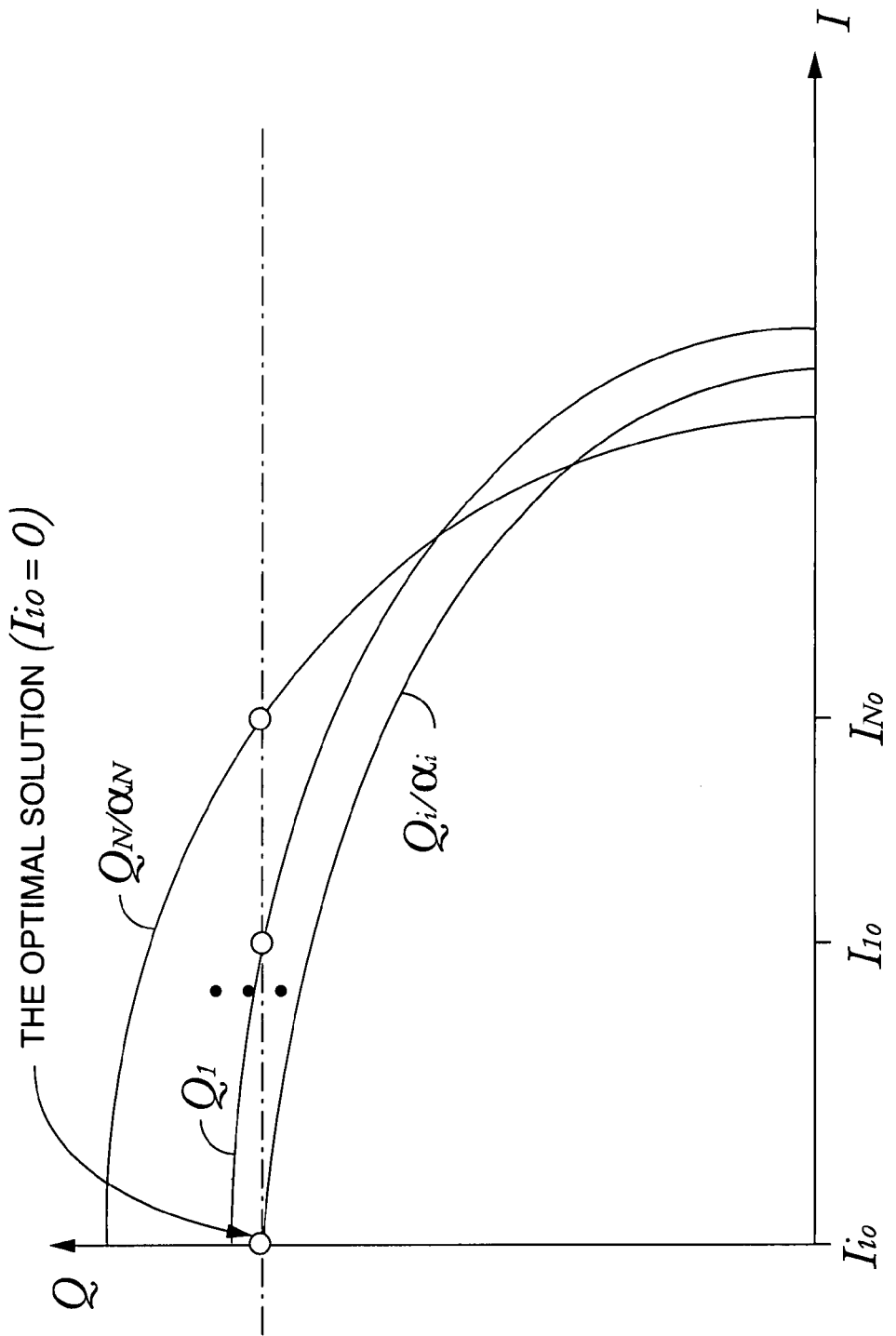
FIG. 4 is a graphical representation of the optimal valve control solution for a given set of flow ratios of a MCFRC system, showing the maximum total allowable valve conductance is achieved for the arrangement of the MCFRC, such as the one shown in the FIG. 1 embodiment.

FIG. 4 shows the optimal solution in terms of the maximum total valve conductance for the MCFRC system to achieve the given set of flow ratio $\{r_i\}$. The optimal solution is obtained when there is a valve, j, at fully open position or $I_j=0$. Any further increase in the height of the horizontal line will result in no solution as a valid solution is the intersections of a horizontal line with all modified valve curves. Therefore, as shown in FIG. 4, there exists one and only one optimal solution for the MCRC system to achieve the given set of flow ratios $\{r_i\}$, and the optimal solution is that there is a valve, j, at fully open position or $I_j=0$. On the other hand, if there is a valve in the MCFRC system at fully open position or $I_j=0$, and the given set of flow ratios $\{r_i\}$ are achieved, the MFCFRC system is at the optimal solution with the maximum total valve conductance.

Figure 5:
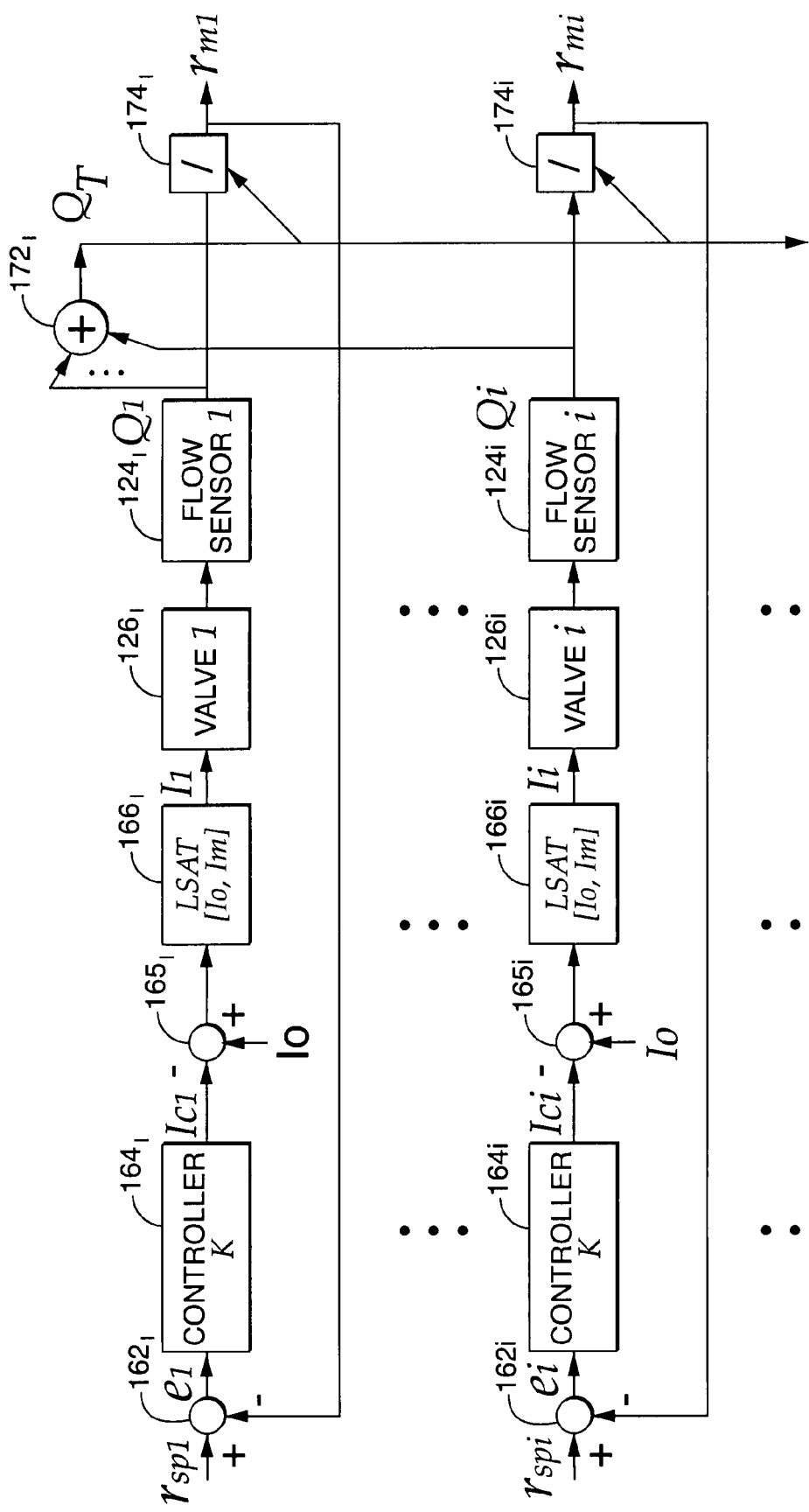
FIG. 5 is a functional block diagram of the preferred multiple antisymmetric optimal (MAO) controller configured and arranged so as to control the ratio of the flow of gas through each of a plurality of channels relative to the entire combined flow through all of the channels.

In the following paragraphs, the multiple antisymmetric optimal (MAO) control algorithm shown in FIG. 5 is shown to be the optimal solution at any given time, i.e. there is always a valve at fully open position or $I_j=0$ for a MCFRC system with normally opened valves. The results also apply to MCFRCs with normally closed valves.

Preferably, the MCFRC system is configured so that all of the valves 126 are simultaneously controlled with the MCFRC controller 136. The MCFRC controller 136 receives the set of flow ratio set points $\{r_{spi}\}$ from the host controller 140, and reports the actual measured flow ratios $\{r_{mi}\}$ and other MCFRC status information back to the host controller 140. The detail of the MAO control algorithm implemented in the MCFRC controller is shown in FIG. 5. The outputs of flow sensors 124, $\{Q_{mi}\}$, are collected and summed to generate a measured total flow, $Q_{Tm}$, at the junction 172. Then the measured flow ratios $\{r_{mi} = Q_{mi}/Q_{Tm}\}$ are calculated and compared with the set of flow ratio set points $\{r_{spi}\}$ to generate the error signals $\{e_i = r_{spi} - r_{mi}\}$. The error signals $\{e_i\}$ are then fed into identical single input and single output (SISO) controllers 164, $\{K_i(s)\}$ to generate the valve control commands $\{I_{ci}\}$. The controllers 164 can be any type of SISO controllers such as PID controllers, lead-lag controllers, model based controllers, etc.; but the controllers 164 are identical, i.e. same type and same control parameters, in order to achieve optimum performance results. The final valve drive currents, $\{I_i\}$, to the valves 126 are obtained by first subtracting the valve control commands, $\{I_{ci}\}$ at the junction 165, from the optimal bias current, $I_o$, and then rectifying them by linear saturators 166 with the lower limit of $I_o$ and the upper limit of $I_m$. The linear saturators 166 are each defined as:

$$LSAT(x)_{[I_o, I_m]} = \begin{cases} x, & (\text{if, } I_o \leq x \leq I_m) \\ I_o, & (\text{if, } x < I_o) \\ I_m, & (\text{if, } x > I_m) \end{cases} \quad (9)$$

where $I_o$ is used as the lower saturation limit and $I_m$ the upper saturation limit.

The linear saturators 166 in the MAO control algorithm can be implemented either in software or in hardware. Many valve drive circuits have lower and upper output limits. If the optimal bias current, $I_o$, happens to be the lower output limit for normally opened valves or the upper output limit for normally closed valves, there is no need to implement the linear saturators 166 in the firmware or software.

The optimal bias current, $I_o$, is the allowable current which provides the maximum valve conductance. For normally opened valves as shown in FIG. 2, the optimal bias current is zero, i.e. $I_o = 0$. As one can see, each flow channel has an identical feedback control loop structure which comprises a flow sensor, a SISO controller, and a flow valve.

The MAO control algorithm as shown in FIG. 5 can be shown to be able to achieve the optimal control solution for a given set of flow ratio set points $\{r_{spi}\}$ at any moment, i.e. there is always a valve, 126j, at full open position or $I_j = 0$ for the MCFRC system with normally opened valves. It can be proved that the valve control command of any flow channel i before the linear saturator, $I_{ci}$ (i=1,2, ... N), is antisymmetric to the summation of all other valve control commands, $I_{cj}$ (j=1,2, ... , N, & j≠i), as $$I_{ci} = -\sum_{\substack{j=1 \\ j \neq i}}^{N} I_{cj}, (i = 1, 2, \ldots, N) \quad (10)$$

This property is called multiple antisymmetry. It can be further proved that there exists at least one valve drive current after the linear saturator, $I_k$, to be equal to the optimal bias current $I_o$ as $$I_k = I_o, (k \in [1, 2, \ldots, N]) \quad (11)$$

Therefore the control algorithm illustrated in FIG. 5 is herein referred to as "multiple antisymmetric optimal" (or "MAO") control. The MAO control algorithm guarantees that the optimal solution is achieved at any moment for the MCFRC system. As discussed before, at the optimal solution, the total valve conductance is maximized, and the settling time and the pressure drop across the MCFRC are both minimized.

The MAO algorithm does not explicitly indicate which valve is at fully open position but it guarantees that at least one valve of all flow valves is at fully open position because of the multiple antisymmetric property of Eq.(10), as discussed above. As shown in FIG. 1, all flow valves have the same upstream pressure conditions as they share the same inlet 122. If all flow valves have similar downstream pressure conditions, the valve with the highest flow should be at fully open position. However, if a severe downstream blocking problem occurs among one of the low flow channels, the MAO control algorithm will drive the flow valve of that downstream blocking flow channel to a more opened position until, if necessary, it stops at the fully open position. If the flow ratio set points are not met, the MAO control algorithm will then drive the highest flow valve, which is originally at fully open position, to a more closed position in order to achieve the targeted flow ratio set points. In this way, the MAO control algorithm can automatically handle severe downstream blocking issues among different flow channels.

The MAO algorithm can also apply to the special case of two-channel flow ratio controller. Such an arrangement differs from the DAO control algorithm as described in the pending parent application U.S. application Ser. No. 11/111,646, filed Apr. 21, 2005 in the names of Junhua Ding, John A. Smith and Kaveh Zarkar, and assigned to the present assignee. The DAO control algorithm disclosed in the pending application uses a single SISO controller for controlling both secondary channels, while the MAO algorithm of the present application would require two identical controllers, one for each of the two secondary channels, for optimum performance results. For either MAO or DAO algorithm, the valve control command $I_{c1}$ and $I_{c2}$ has the antisymmetric property as $$I_{C1} = -I_{C2} \quad (14)$$

Applying the MAO algorithm to a two-channel flow ratio controller results in the two SISO controllers being identical. One can remove one of the SISO controllers, required for the MAO algorithm, and divert the negative control output command, $-I_c$, to the other valve control loop as suggested by Eq.(14). In this way, the MAO control algorithm would become identical to the DAO control algorithm for the two-channel flow ratio controller as described in the pending application. However, as described below, one may want to use two different SISO controllers or two different linear saturators, where for example less than optimal performance can be tolerated.

Thus, the MAO controller is configured to provide the following:

(a) antisymmetric optimal control of the mass flow in the secondary flow lines so as to maintain the ratios of the secondary flows relative to the total flow at preselected set point ratios;

(b) at least one of the valves is at the optimal valve current $I_o$, providing maximum allowable valve conductance position at any one moment of operation, while the other valve is actively controlled to maintain the preselected set value of the flow ratio; and (c) control of the mass flow in the secondary flow lines so as to maintain the ratio of the secondary flows at the preselected set point such that should the flow decrease in one flow line so that the ratio of the secondary flows deviates from the preselected set point, the controller will adjust the relative secondary flows through the secondary flow lines so as to bring the ratio back to the preselected set point.

Thus, a new and improved gas delivery system and method provided in accordance with the present disclosure have been described. The exemplary embodiment described in this specification have been presented by way of illustration rather than limitation, and various modifications, combinations and substitutions may be effected by those skilled in the art without departure either in spirit or scope from this disclosure in its broader aspects and as set forth in the appended claims. For example, while the valves have been described mostly as normally opened valves, it is also valid for normally closed valves. Further, as described above, for optimum control performance the controllers 164 are identical SISO feedback controllers, i.e. the controllers are of the same type and have the same control parameters. In addition, identical linear saturators are required for optimum control performance. In many applications, however, suboptimal performance may be acceptable, such that the SISO feedback controllers, and/or the linear saturators are not identical, and/or none of the valves are completely opened during operation (in which case, maximum valve conductance is not provided). In this context the term "substantially optimal" shall mean some percentage of optimal performance that is less than 100%, but high enough to achieve the desired results. For example, such a suboptimal performance may be at 95% of optimum for some applications, and still provide satisfactory results. In the context of controlling the ratio of only two secondary flow lines, this would necessitate that the SISO feedback controllers and/or linear saturators not be identical, only substantially identical, and would necessarily require two feedback controllers providing a different implementation from the one described in the pending application relating to the DAO.

The gas delivery system and method of the present disclosure as disclosed herein, and all elements thereof, are contained within the scope of at least one of the following claims. No elements of the presently disclosed system and method are meant to be disclaimed, nor are they intended to necessarily restrict the interpretation of the claims. In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A multiple-channel gas delivery system, comprising:
a primary channel;
at least three secondary channels; and
a flow ratio controller coupled to the primary channel and the plurality of secondary channels so as to receive a gas through the primary channel and control a ratio of the flow rate of the gas through each of the secondary channels relative to the total flow rate entering the system, wherein the flow ratio controller includes for each secondary channel a flow sensor and a valve actively controlled by a single input single output (SISO) feedback controller to achieve a targeted flow ratio set point, wherein each secondary channel includes a secondary channel control loop including the sensor, valve and feedback controller, where the system further includes a linear saturator for each secondary channel control loop.

2. A system according to claim 1, wherein the SISO feedback controllers comprise at least one of: a PID controller, a lead-lag controller, and a model based predictive controller.

3. A system according to claim 1, wherein all of the SISO feedback controllers are substantially identical, and all of the linear saturators are substantially identical.

4. A multiple-channel gas delivery system, comprising:
a gas inlet channel, and at least three secondary channels;
a flow meter, including a flow sensor and a valve, arranged so as to control the flow through each of the secondary channels, wherein each secondary channel includes a secondary channel control loop including the sensor, valve and feedback controller, where the system further includes a linear saturator for each secondary channel control loop;
a multiple antisymmetric optimal (MAO) controller configured and arranged so as to control the ratio of the flow of gas through each of the at least three secondary channels relative to the entire combined flow through all of the secondary channels, wherein the multiple antisymmetric optimal controller is configured so as to provide (a) substantially optimal control of the mass flow in the secondary flow channels so as to maintain the ratios of the secondary flows relative to the total flow, (b) control of the mass flow in each of the secondary flow channels so as to maintain the ratio of the secondary flows at preselected set points such that should the flow decrease in one flow channel so that the ratio of the secondary flows deviate from the preselected set point, the multiple antisymmetric optimal controller will adjust the relative secondary flows through the secondary flow channels so as to bring the ratio back to the preselected set point;
wherein at least one of the valves provides substantial maximum allowable valve conductance position at any one moment of operation, while the other valves are actively controlled to maintain the preselected value of the flow ratio through each of the corresponding secondary channels.

5. A multiple-channel flow ratio controller system, comprising:
(A) a flow ratio controller including (a) an input constructed and arranged so at to couple the controller system to a primary channel; (b) a plurality of outputs constructed and arranged so as to couple the controller system to a corresponding number of secondary channels, wherein the number of secondary channels is three or more; (c) a corresponding plurality of flow sensors, control valves and SISO controllers, wherein each secondary channel includes a secondary channel control loop including one of the plurality of flow sensors, one of the plurality of valves and one of the plurality of SISO controllers; and
(B) a plurality of linear saturators, one associated with each valve;
wherein the flow ratio controller is configured and arranged so as to receive a gas through the primary channel, control the ratio of the flow rate of the gas through each of the secondary channels relative to an entire flow rate, and achieve a substantially optimal control solution for a given set of flow ratio set points ($r_{spi}$) at any moment, wherein the substantially optimal control solution is achieved by:
(i) determining a measured flow ratio through each of the secondary channels; (ii) determining a sum of the outputs of the flow sensors ($Q_{mi}$) as representative of a measured total flow ($Q_{Tm}$) (iii) comparing the measured flow ratio through each of the secondary channels with the corresponding flow ratio set point so as to generate an error signal for each such secondary channel; and (iv) applying each of the error signals to a corresponding SISO feedback controller so as to generate a valve control command associated with the corresponding control valve so as to achieve flow rates through the secondary channels which correspond to the set of flow ratio set points, and (v) generating a final valve drive current (x, or $I_i$) for each of the valves as a function of an optimal bias current associated with each valve less the corresponding valve control command; and rectifying each final drive current with a corresponding linear saturator having a lower saturation limit ($I_o$) and an upper saturation limit ($I_m$), wherein each linear saturator is defined as:

$$LSAT(x)_{[l_o, l_m]} = \begin{cases} x, & (\text{if, } I_o \le x \le I_m) \\ I_o, & (\text{if, } x < I_o) \\ I_m, & (\text{if, } x > I_m) \end{cases}$$

wherein $I_o$ is used as the lower saturation limit, $I_m$ is used as the upper saturation limit, and x is used as the final valve drive current.

6. A system according to claim 5, wherein the linear saturators are implemented in software.

7. A system according to claim 5, wherein the linear saturators are implemented in hardware.

8. A system according to claim 5, wherein the valve control command generated from the SISO controller before the linear saturator for each of the valves has the multiple antisymmetric property as $$I_{ci} = -\sum_{\substack{j=1 \\ j \ne i}}^{N} I_{cj}, (i = 1, 2, \ldots, N)$$

where N is the total number of secondary flow channels.

9. A system according to claim 5, wherein at least of the valves is at the maximum allowable open position at any moment.

10. A method of controlling the ratio of the flow rate of gas from a primary channel through each of a plurality of secondary channels relative to an entire flow rate in accordance with a substantially optimal control solution for a given set of flow ratio set points $r_{spi}$ at any moment, wherein the method comprises:

(i) determining a measured flow ratio through each of the secondary channels, wherein the plurality of secondary channels includes three or more secondary channels;

(ii) determining a measured total flow ($Q_{Tm}$) as a function of the measured flow through each of the secondary channels;

(iii) comparing the measured flow ratio through each of the secondary channels with a corresponding flow ratio set point so as to generate an error signal for each such secondary channel; and (iv) applying each of the error signals to a corresponding SISO feedback controller so as to generate a valve control command associated with a corresponding control valve used to control the flow of gas through the respective secondary channel so as to achieve flow rates through the secondary channels which correspond to the set of flow ratio set points; and (v) generating a final valve drive current (x, or $I_i$) for each of the control valves as a function of an optimal bias current associated with each control valve less the corresponding valve control command; and rectifying each final drive current with a corresponding linear saturator having lower saturation limit ($I_o$) and an upper saturation limit ($I_m$), wherein each linear saturator is defined as:

$$LSAT(x)_{[l_o, l_m]} = \begin{cases} x, & (\text{if, } I_o \le x \le I_m) \\ I_o, & (\text{if, } x < I_o) \\ I_m, & (\text{if, } x > I_m) \end{cases}$$

wherein $I_o$ is used as the lower saturation limit, $I_m$ is used as the upper saturation limit, and x is used as the final valve drive current.

11. A method according to claim 10, wherein rectifying each final drive current is implemented in software.

12. A method according to claim 10, wherein rectifying each final drive current is implemented in hardware.

13. A method according to claim 10, wherein the valve control command generated by the SISO controller before the linear saturator for each valve has the multiple antisymmetric property as $$I_{ci} = -\sum_{\substack{j=1 \\ j \ne i}}^{N} I_{cj}, (i = 1, 2, \ldots, N)$$

where N is the total number of secondary flow channels.

14. A method according to claim 10, wherein at least of the valves is at the maximum allowable open position at any moment.

* * * * *